July 20, 1948.　　　　R. C. WALKER　　　　2,445,725
TIRE CONSTRUCTION
Filed June 14, 1944　　　　　　　　　　　2 Sheets-Sheet 1

INVENTOR
RALPH C. WALKER
BY
ATTORNEYS

July 20, 1948.    R. C. WALKER    2,445,725
TIRE CONSTRUCTION
Filed June 14, 1944
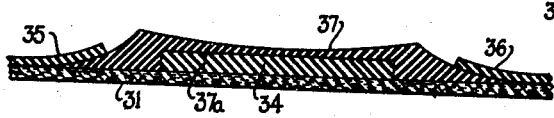
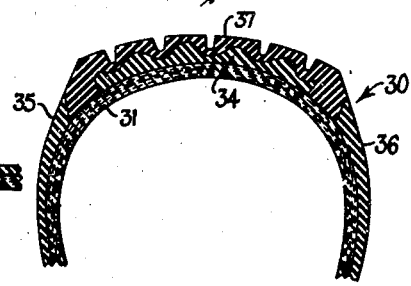
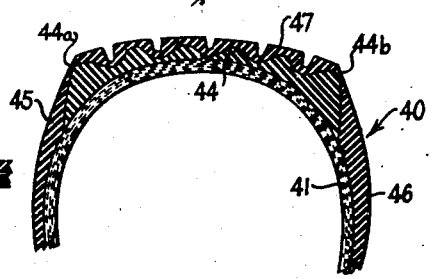
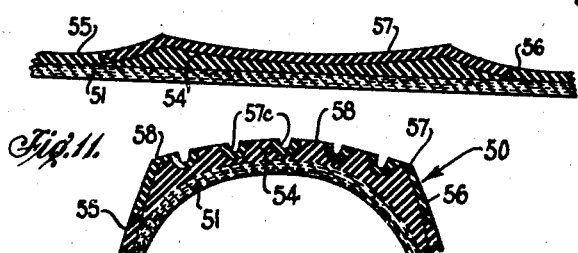
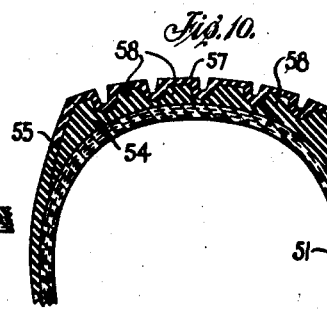
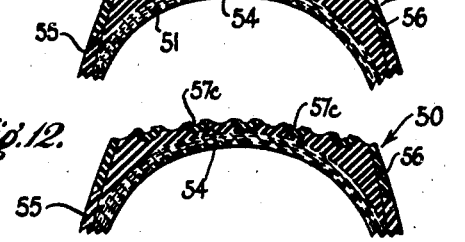
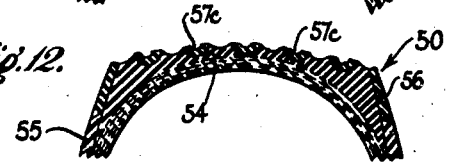
INVENTOR
RALPH C. WALKER
ATTORNEYS Patented July 20, 1948

2,445,725

UNITED STATES PATENT OFFICE 2,445,725

TIRE CONSTRUCTION

Ralph C. Walker, Akron, Ohio, assignor to The Firestone Tire & Rubber Company, Akron, Ohio, a corporation of Ohio Application June 14, 1944, Serial No. 540,257

1 Claim. (Cl. 152—374)

This invention relates to arrangements of materials, especially to the arrangement of rubber materials in a tire.

A pneumatic rubber tire construction ordinarily includes a tire body consisting of a plurality of plies of rubberized fabric, tire beads to which the marginal edges of said plies are anchored, a thick layer of specially compounded tough rubber composing the tire tread, the edge portions of said tread merging into relatively thin tire sidewall portions. A soft cushioning ply of rubber is normally positioned between the body and the tread to aid in absorbing flexing of the tread and tire body and allow slight relative movement therebetween. This cushion ply is quite thin with relation to the tread.

Because of the cost of high grade rubber, it is important that tires be made with a minimum use of such rubber without, however, sacrificing appreciable performance of the tire.

With the foregoing and other conditions in mind, it is the general object of this invention to produce a novel and improved tire construction by a new arrangement of rubber materials in the tire.

A further object of the invention is to construct a long wearing tire at reduced cost from a small amount of high grade rubber, which tire has good anti-skid properties and will retain such properties even though the tread's anti-skid portions have become substantially worn away.

Another object of the invention is to provide a flatter surfaced, quieter running tire than standard constructions.

The foregoing and other objects will be apparent in the following description of the invention when considered in the light of the accompanying drawings, in which:

Fig. 5 is a fragmentary transverse section, similar to Fig. 2, of a modification of the invention:

Fig. 6 is a fragmentary section, similar to Fig. 4, of the tire of Fig. 5:

Figure 1:
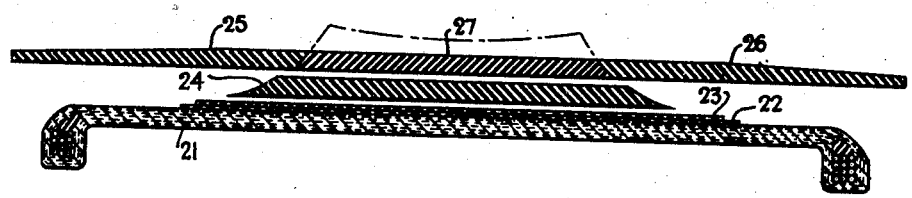
Fig. 1 is a diagrammatic transverse section of the components of a tire embodying the invention and showing the components prior to the assembly thereof in the tire construction.
Figure 2:
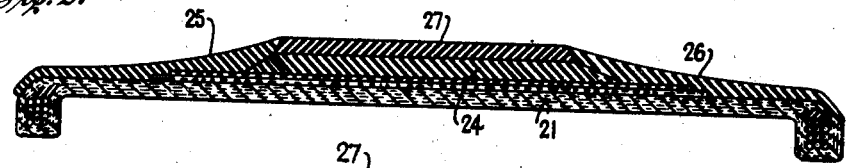
Fig. 2 is a transverse section of the tire of Fig. 1 with the components assembled into a drum-built tire band.
Figure 3:
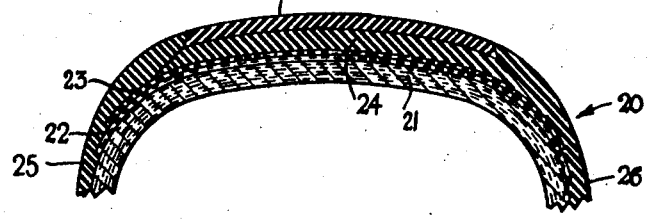
Fig. 3 is a fragmentary transverse section of the tire of Fig. 2, shaped into tire form.

Figs. 7, 8, 9 and 10 are views, similar to Figs. 5 and 6 of further modifications of the invention; and Figs. 11 and 12 are fragmentary transverse sections of the tire of Figs. 9 and 10, illustrating successive stages of wear.

Referring specifically to Figs. 1 to 4 of the drawings, a tire 20 is shown, which tire mainly comprises a fabric body 21, breaker plies 22 and 23, a tread base layer 24, sidewalls 25 and 26, and an outer tread layer 27. The body 21, breakers 22 and 23 and sidewalls 25 and 26 are of standard construction. The tread base layer 24, as shown in the drawings, is at least substantially as thick as the outer tread layer 27 which is made from a high grade, high carbon black, wear resistant tread stock as will be understood by those familiar with the art. The tread base 24 is relatively soft and flexible and contains high amounts of reclaimed rubber and/or fillers and relatively low amounts of carbon black and high grade rubber, either natural or synthetic.

Figure 4:
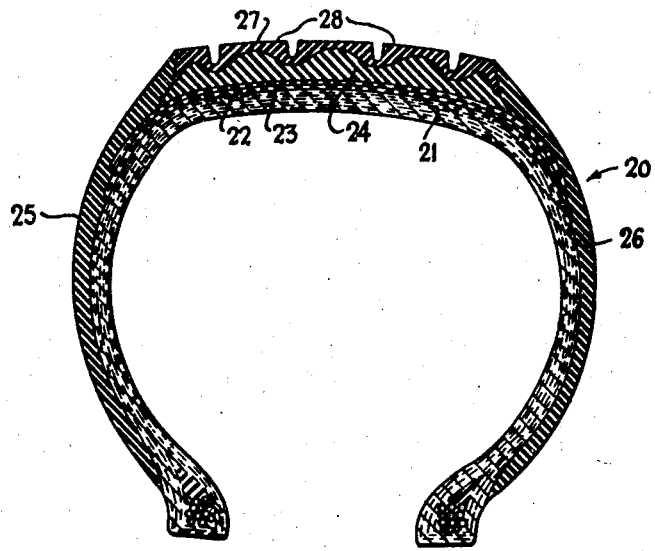
Fig. 4 is a transverse section of the tire of Fig. 2 after being molded and vulcanized.

In Fig. 1, the normal size or thickness of the outer tread layer 27 is indicated by a dotted line which shows the savings in high grade tread stock effected by practice of the invention. In the molded tire, as shown in Fig. 4, it is to be noted that the tread base layer 24 has flowed up into ribs 28, formed in the outer tread layer 27 by the molding thereof. This flow is due to the heat and pressure applied to the tire during vulcanization thereof in the mold. It will be understood by those familiar with the art that the flow or lifting of the tread base layer 24 may be controlled, at least to some extent, by the design or placement of the stock in the tire portions 24, 25, 26 and 27.

The outer tread layer 27 and sidewalls 25 and 26 may be integrally formed prior to assembly in the tire, although they normally are made from different type stocks, as shown.

In operation, the tire 20 has given excellent performance. The tire possesses soft riding characteristics because of the large volume soft tread base cushion. The mileage yield of the stock in the outer tread layer of a tire constructed in accordance with the present invention is equal to or even greater than that of the same stock in the tread of tires constructed in accordance with previous commercial practice. Such results have been obtained through practice of the invention with resultant savings in consumption of high grade rubber and in tire cost.

In a modification of the invention, a tire 30 shown in Figs. 5 and 6, includes a body 31, a tread base layer 34, and separate sidewalls 35 and 36 which overlap the edges of an outer tread layer 37. It will be noted that the layer 34 is received in a channel or recess 37a formed in the inner surface of the outer tread layer 37. Again, the tread base is made from a soft, low grade rubber compound.

A tire 40, Figs. 7 and 8, is a further embodiment of the invention and includes a body 41, a tread base layer 44, sidewalls 45 and 46, and an outer tread layer 47. Note that shoulders 44a and 44b are formed on the tread base layer at the edges thereof, whereby the transverse surface of the tire 40 can be made flatter than standard constructions with minimum cost and use of critical material, i. e., high grade rubber. Note the relatively great thickness of the tread base layer 44, which is made from relatively soft, low grade rubber, and which is entirely confined in the tire 40 by the tread and sidewall plies. Improved riding comfort and quieter operation result from the use of the flatter tread shown in Fig. 8, especially when combined with the use of a large volume, soft, cushioning tread base layer, as is contemplated by the present invention.

Figs. 9 and 10 show a tire 50 that is made from a body 51, an integrally formed tread base layer 54, sidewalls 55 and 56, and an outer tread layer 57. The latter is in the form of a thin, even veneer of tread rubber in order to provide a uniform wearing surface. The tread veneer extends over the entire surface of ribs 58 formed in the tire during the vulcanization thereof as well as across the valleys formed between adjacent ribs. The veneer may be of regular tread compound or may contain a higher than normal percent of carbon black. The supporting material, or tread base layer 54, may be made from a reclaimed rubber stock containing a minimum of high grade rubber, as previously described herein. In this base layer, the carbon black content, for example, may be as low as 24%. Also, the reclaimed rubber, used in the tread base layer, can be selected so as to provide a strong bonding between the tread veneer 57 and the body 51, although satisfactory adhesion of the tread is obtained in all forms of the invention.

A further feature of the invention is that after appreciable wear of the tire 50, concave sections 57c of the tread veneer 57, as shown in Figs. 11 and 12, remain in the tread surface, protruding from the valleys formed between the ribs 58, to form skid resistant, reinforcing edges in the tread. Hence, even after continued wear, the edges of the ribs 58 remain armored with sharp edges of the tough veneer compound which continues the anti-skid effectiveness of each rib until that particular rib is completely worn to the bottom of its adjacent tread grooves.

A feature of the tire 50 is that the thin veneer of high carbon black content tread rubber does not crack. Furthermore, satisfactory adhesion of the tread is obtained and flexibility of the tread with relation to the body results.

While several embodiments of the invention have been illustrated and completely described herein, it will be understood that various modifications thereof may be made without departing from the scope of the invention as defined in the appended claim.

What is claimed is:

A tread for a pneumatic tire comprising an outer and an inner layer of rubber compound, said tread having circumferentially extending ribs defining grooves therebetween, said outer layer being of uniform thickness and being relatively thin compared to the total thickness of said tread at the ribbed portions thereof, said outer layer being formed of a better road wear resistant rubber compound than said inner layer, said inner layer being formed of a rubber compound having better adhesive qualities than said outer layer, the rubber compound of said inner layer extending into said ribs and forming the central portions thereof whereby when said outer layer on said ribs wears off to expose said inner layer, portions of said outer layer will remain between said ribs and on the sides of the ribs to reenforce said ribs and provide good edge wearing surfaces therefor.

RALPH C. WALKER.

REFERENCES CITED

The following references are of record in the file of this patent:

UNITED STATES PATENTS

| Number | Name | Date |
| --- | --- | --- |
| 603,161 | Bagot | Apr. 26, 1898 |
| 1,254,884 | Chinnock | Jan. 29, 1918 |
| 1,719,628 | Sloman | July 2, 1929 |
| 1,769,694 | Jenkinson | July 1, 1930 |
| 2,027,248 | Reel | Jan. 7, 1936 |
| 2,118,774 | Cadwell | May 24, 1938 |
| 2,241,227 | Wait | May 6, 1941 |